Patented Feb. 1, 1927.

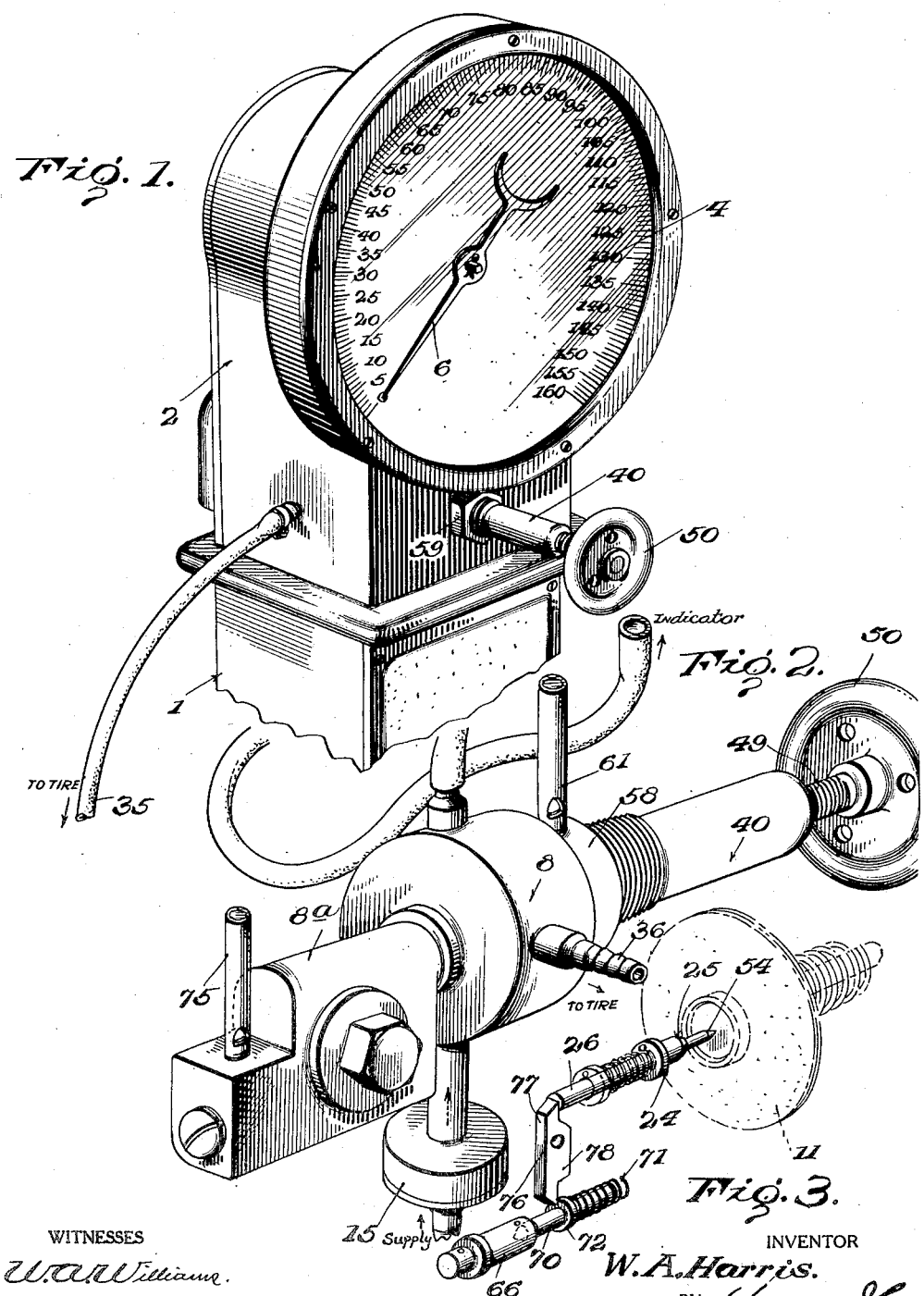

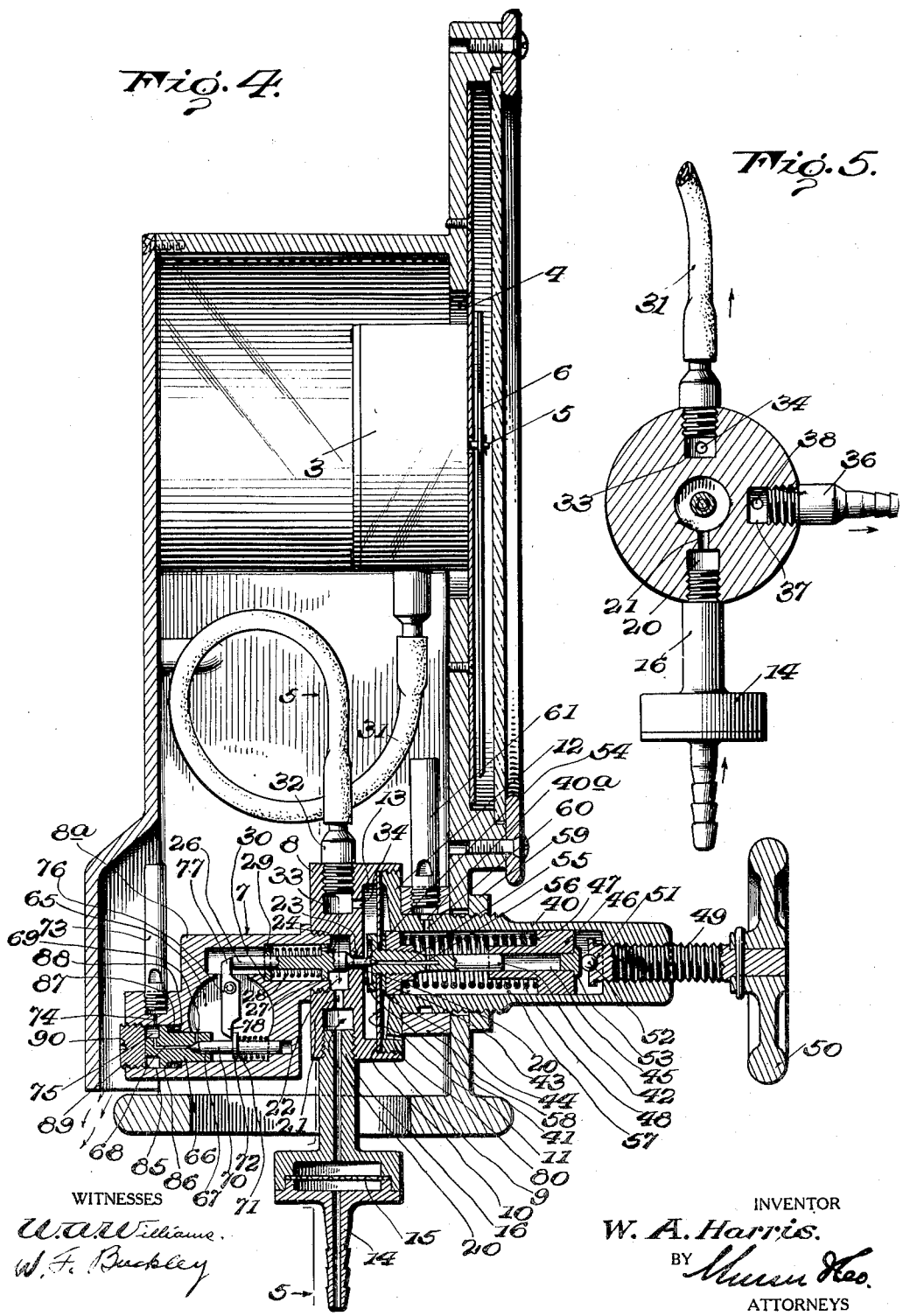

1,615,943

UNITED STATES PATENT OFFICE.

WILLIAM A. HARRIS, OF GREENVILLE, SOUTH CAROLINA, ASSIGNOR TO G. & H. TIRE CHUCK GAUGE CO., INC., OF GREENVILLE, SOUTH CAROLINA, A CORPORATION OF SOUTH CAROLINA.

DEVICE FOR INFLATING AND DEFLATING PNEUMATIC TIRES.

Application filed August 13, 1925. Serial No. 50,100.

This invention relates to a device for use in inflating and deflating pneumatic tires of vehicles to the requisite degree and is especially designed for use at filling stations although also adapted for use universally.

The object of the invention resides in the provision of a device of this character which may be manually set to supply the tires to be inflated with practically any number of pounds of air pressure and which will automatically deflate the tires should they contain more pressure than that for which the device has been set. The device accomplishes these purposes without the use of the ordinary hand gage and without the necessity of removing the air chuck from the valve stem of the tire after the same has been applied thereto.

One of the principal objects of the invention is to provide a device having these advantages and capacities and which will sound an audible signal during the entire period of inflation or deflation.

The invention contemplates the use of a signal of one tone to indicate that the inflating operation is going on and a signal of another and different tone to indicate that the deflating operation is going on.

Another and important object of the invention resides in the provision of a device of this character wherein the supply and exhaust of air is regulated by a pressure controlled valve whose operation is under the direct and immediate control of an air gage of the standard type.

A further object resides in the provision of a device of this character which is of simple and durable construction, reliable and accurate in operation and easy and comparatively inexpensive to manufacture. With this invention the accuracy of the gage is not impaired by use so that the apparatus is reliable in operation even after having been used over a long period of time.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a fragmentary perspective view showing a device constructed in accordance with the present invention, Figure 2 is a perspective view showing the unit containing the valves prior to assembly with the gage and stand, Figure 3 is a group view in perspective illustrating the mode of operating the inflating whistle valve from the main air supply valve, Figure 4 is a view partly in central vertical section and partly in elevation showing the device mounted on the stand and coupled up with the gage, and Figure 5 is a fragmentary view in section on the line 5—5 of Figure 4.

Referring to the drawings the numeral 1 designates generally a stand having a head 2 on which the device constituting the present invention is mounted. The head 2 has a gage, designated generally at 3, mounted thereon and which may be of any standard or conventional type, as for instance, the Bourdon type gage. The gage is fixed on the rear of the dial plate 4 having graduations and numerals thereon affording gage readings from "0" to 150 lbs. The shaft of the gage, which is designated at 5, has a pointer 6 fixed thereto, the pointer 6 being co-operable with the graduations and numerals of the dial plate 4.

Except for the gage just described, the present invention is assembled in the form of a single unit, designated generally at 7 and mounted on the head 2 of the stand. The unit comprises a stock consisting in general of a short cylindrical casing 8 and an angularly formed casing or housing 8ª, the parts 8 and 8ª being threadedly connected to each other. The casing 8 has an internally threaded flange 9 at one end and an internal shoulder 10 adjacent the inner end of the flange. A diaphragm 11 has its marginal portion fitted up against the shoulder 10 within the flange 9 and is held up against the flange by means of a closure plate 12 having external threads on its periphery engaged with the internal threads of the plate 9 and serving to clamp the diaphragm 11 in position and to close the end of the casing 8 with which it is associated. As illustrated to advantage in Fig. 4 the diaphragm 11 coacts with the casing 8 to define a pressure chamber or outlet chamber 13. To this pressure chamber air is supplied from a pump or tank by means of an air line 14 having a screen or strainer 15 incorporated therein and provided with a nipple 16 threaded into a radial opening 20 formed in the casing 8 and communicating by means of a radial passage 21 with an inlet chamber 22 also provided in the casing 8ᵃ and communicating with the pressure chamber or outlet chamber 13 through an axial port 23. The communication of the inlet chamber 22 with the outlet or pressure chamber 13 is controlled by means of a main valve, designated generally at 24, and having a head 25 cooperable with the valve seat provided therefor around one end of the port 23. The valve 24 also has a stem 26 and at the juncture of the stem and head the valve has an integral collar 27 with which one end of a coil spring 28 is engaged, the other end of the coil spring engaging a plate 29 abutting a shoulder 30 provided adjacent the rear end of the inlet chamber 22, whereby the coil spring tends to hold the head 25 of the valve 24 engaged with its seat to prevent flow of pressure from the inlet chamber 22 to the pressure or outlet chamber 13.

The gage 3 communicates with the chamber 13 by means of a flexible pipe 31 leading from the gage and connected by a nipple 32 with a radial passage 33, the latter communicating with the outlet or pressure chamber 13 through a port 34. A flexible hose or air line 35 is provided and has the usual air chuck (not shown) to facilitate the coupling of the air line with the tire valve stem. This hose 35 is connected to a nipple 36 threaded into a radial opening 37 provided in the casing 8, the radial opening 37 freely communicating with the pressure chamber 13 through a port 38.

The head or end plate 12 which clamps the diaphragm 11 in position has integrally formed therewith or suitably secured thereto a tubular extension 40 which projects outwardly beyond the head of the stand and which houses and carries an adjusting and controlling mechanism provided for the diaphragm and now to be described. At the center of the diaphragm 11 and on the side thereof exposed to the pressure in the chamber 13 a flanged plate 41 is positioned and has an axially extending stud 42 which penetrates the diaphragm and extends for a substantial distance into the tubular extension 40. A combined sealing member and nut 43 is threadedly engaged with the portion of the stud 42 adjacent the diaphragm the combined sealing member and nut being located on the opposite side of the diaphragm from the plate 41 and serving when turned up to clamp the plate 41 and a gasket 44 firmly against the central portion of the diaphragm. The periphery of the combined nut and sealing member 43 is smooth and is a snug working and sliding fit in the tubular extension 40. The outer end of the stud 42 is smooth and is slidably fitted in the axial bore 45 of a slidable spring abutment 46 fitted in the tubular extension and having a shoulder 47 engaging one end of a diaphragm tensioning spring 45. The other end of the diaphragm tensioning spring engages the combined sealing member and nut 43. The tension of the spring 48 is adjusted and regulated at will by means of a screw 49 threadedly engaged with the outer end of the tubular extension 40 and turned by means of a hand wheel 50. At its inner end the screw 49 is provided with a recess 51 in which a ball 52 is received, the ball bearing against a thrust plug 53 engaged with the bore 45 of the abutment 46. As the hand wheel 50 is turned the screw is advanced in the extension or moves out of the extension, depending on the direction in which it is turned and the axial movement of the screw resulting from its rotation is transmitted to the abutment 46 through the ball 52 and through the plug 53. In this way the tension of the spring 48 may be varied with precision. The head 25 of the valve 24 has an axial extension 54 which has its outer end formed to constitute a valve face co-operable with a valve seat formed at one end of an axial passage 55 provided in the plate 41 and in the stud 42 and communicating with transverse passages 56 leading into the discharge chamber 57 defined within the tubular extension 40. The abutment 46 being a smooth sliding fit in the tubular extension and the screw 49 constrains the air to escape from the discharge chamber 57 through a port 60 and whistle 61. The whistle 61 is mounted on a collar 58 provided on the tubular extension 40. The tubular extension 40 has an angular groove 40ᵃ extending around within the collar so that communication is had even though the collar be angularly shifted on the extension. A nut 59 is threadedly engaged with the tubular extension and co-acts with the collar 58 and casing 8 to hold the entire unit in position on the head of the stand. The only time that the air escapes from the discharge chamber through the whistle 61 is when the valve 21 is closed and the diaphragm 11 flexed to cause the valve 54 to be unseated and this condition results only when the pressure in the tire is higher than it should be, whereupon the pressure in the tire is reduced down to the proper amount as will more clearly appear in the description of the operation hereinafter included. An important point to be noted is that for the entire period of deflation the whistle 61 is sounded.

It is also proposed to sound an audible signal during the entire period of inflation, and for this purpose the collar 27 and the plate 29 are provided with ports, as shown in Fig. 4, so that the pressure existing in the chamber 22 also exists in a chamber 65 communicating with the chamber 22 through the ports just mentioned and having a valve seat 66 projecting therethrough. The valve seat 66 has an axial opening 67 extending into the same from its outer end and communicating with a longitudinally and laterally extending passage 68 and a transversely extending passage 69. A valve 70 is slidably fitted in the opening 67 and controls the communication between the passage 69 and the passage 68. A spring 71 encircles the valve 67 and at one end engages a collar 72 integrally formed with the valve 70 and at its opposite end engages an adjacent portion of the part 8ª of the stock. The passages 69 and 68 lead to a whistle 73 threadedly connected with the part 8ª and communicating with the passages in the valve seat through a port 74 and a recess 75 in the valve seat. The valve 70 is opened automatically whenever the valve 24 is unseated and this operation is effected by means of a rock arm or lever 76 fulcrumed on the part 8ª of the stock and having a short arm 77 engaged by the stem 26 of the valve 24 and a long arm 78 engaging the collar 72 of the valve 70 as illustrated to advantage in Figs. 3 and 4.

When it is desired to inflate a tire the hand wheel 50 is turned until the pointer 6 registers with the degree of pressure to which the tire is to be inflated. When the hand wheel 50 is turned the screw 49 is turned and the tension of the spring 48 is increased or decreased, depending upon which way the wheel 50 is turned. Now, if the pointer had been at zero and it was desired to inflate the tire to twenty-five pounds, the hand wheel 50 would be turned to cause the screw to advance inwardly which would also cause the abutment 46 to advance inwardly and increase the tension of the coil spring 48. This increased tension of the coil spring would, of course, increase the force tending to flex the diaphragm 8 to the left as viewed in Fig. 4. The flexing of the diaphragm to the left, as viewed in Fig. 4, would result in an unseating of the valve 25 due to the fact that the plate 58 fixed to the diaphragm engages the extension 54 of the valve 24. When the valve 25 is unseated the air under pressure which is always present in the inlet chamber 22 flows through the port 23 into the pressure chamber 13 until the pressure in the chamber 13 is sufficient to flex the diaphragm 11 to the right as viewed in Fig. 4 to permit the valve 25 to engage its seat. Now then when the chuck is applied to the tire valve stem the air will flow from the pressure chamber 13 through the port 38 and opening 37 into the nipple 36 and air hose 35. However, only the proper degree of pressure may be supplied to the tire for the reason that the valve 25 closes when the pressure in the chamber 13 reaches the desired amount and opens when the pressure chamber falls below the desired amount.

All during the time that the air is flowing from the inlet chamber 22 through the port 23 into the pressure chamber and from the pressure chamber into the tire an audible signal is given so that the operator is given notice that air is actually being supplied into the tire. This audible signal throughout the entire filling operation is brought about due to the fact that the unseating of the valve 25 effects an unseating of the valve 70 and permits a small amount of the pressure in the inlet chamber 32 to flow out through the whistle 73. An important point to be noted is that the whistle 73 is sounded throughout the inflating operation. Due to the fact that the motion of the valve 24 is multiplied before being transmitted to the valve 70 a whistle is sounded even though it is necessary to supply but a small amount of air pressure to the tire to raise the air pressure in the tire to the desired extent. The multiplication of the motion is one factor in obtaining a signal even though a small increase is needed and another factor in obtaining this result resides in the adjustment provided between the valve 70 and its seat 66. The valve seat 66 is a sliding fit in the opening 85 in which it is fitted and this valve seat has a shoulder 86 which engages one side of a rubber gasket 87 interposed between a shoulder 88 formed on the part 8ª of the stock. A plug 89 is threaded into the opening 85 and engages the valve seat. This plug is provided with a slot 90 to facilitate turning of the same by means of a screw driver or the like. With this arrangement the plug 89 may be turned until the essential nicety of adjustment is had between the valve 70 and its seat 66. The rubber washer 88 not only gives the range of adjustment required but also locks the parts in adjusted position.

If, as stated, it was desired to have a pressure of twenty-five pounds in the tires and as a matter of fact the pressure within the tires was in excess of that amount, say for instance, thirty pounds when the air chuck was applied to the tire valve stem, the greater pressure in the tire would immediately build up in the pressure chamber 13 and this greater pressure would force the diaphragm 11 to the right as viewed in Fig. 4 even after the valve face 25 of the valve 24 had engaged its seat whereupon the valve provided by the extension 54 will become disengaged from its seat at one end of the passage 55. The unseating of this valve 54 will permit the pressure in the chamber 13 to exhaust through the passages 55 and 56, port 60, angular groove 40ª and whistle 61, thereby sounding the whistle. Of course, the exhaustion of the pressure in this manner would deflate the tire and during the entire period of deflation a whistle would be sounded. When the tire has been deflated down to twenty-five pounds the pressure in the chamber 16 will be correspondingly decreased and the spring 48 will then flex the diaphragm against this reduced pressure to cause the valve 54 and its seat to be engaged but the diaphragm will not be flexed so far as to disengage the valve 25 from its seat unless the pressure in the chamber 13 be reduced below a pressure of twenty-five pounds. This same action occurs irrespective of whether the hand wheel 50 be turned to inflate to twenty-five pounds or of any other value within the range of the gage. An important feature of the invention resides in the fact that it is not necessary to have the spring 48 and its associated parts of accurately calibrated strength and size. The spring need only have the range to exert the requisite pressure on the diaphragm. In this way the present invention makes it possible to use a standard type of gage which has been practically perfected and which is well adapted to give accurate gage readings even after having been in use over a long period of time. The gage need noly be observed as the handle 50 is turned inward to apply the necessary pressure to the diaphragm.

In order that the diaphragm 11 may freely flex the vent 80 is formed in the end plate 12 to permit escape of any leakage that might possibly occur past the diaphragm.

I claim:—

1. In a device of the character described, a casing having a pressure chamber therein, means for supplying air under pressure to said chamber, a valve controlling the supply of pressure to the chamber, a diaphragm exposed to the pressure in the chamber, said diaphragm having means provided with passageways permitting the exhaust of air from the chamber, said valve having an extension co-operable with said means to control the exhaust of air, a spring for urging the diaphragm toward the valve, manually operable means for varying the tension of the spring, a gage connected with the pressure chamber, and discharge means leading from the pressure chamber.

2. In a device of the character described, a casing having a pressure chamber, means for supplying air under pressure to the chamber, a valve controlling the supply of air from said means to said chamber, pressure responsive means exposed to the pressure in the pressure chamber and cooperable with the valve to control the opening and closing of the same, manually operable elastic means for biasing the action of the pressure responsive means to any desired extent, a gage connected with the pressure chamber, a whistle, means establishing communication between the whistle and the means for supplying air to the air chamber, a valve controlling the communication between the whistle and the means for supplying air, and mechanism for opening said last-mentioned valve whenever and as long as the first-mentioned valve is unseated.

3. In a device of the character described, a valve controlled means for supplying air under pressure to a tire, and an audible signal sounded by the air for the entire period that the air is supplied to the tire.

4. In a device for inflating and deflating tires, valve controlled means regulating the inflation and deflation of the tire, and audible signals automatically sounded for the entire period of inflation and deflation.

5. In a device of the character described, a casing having a pressure chamber therein, means for supplying air under pressure to said chamber, a valve controlling the supply of pressure to the chamber, a diaphragm exposed to the pressure in the chamber, said diaphragm having means provided with passageways permitting the exhaust of air from the chamber, said valve having an extension co-operable with said means to control the exhaust of air, a spring for urging the diaphragm toward the valve, manually operable means for varying the tension of the spring, a gage connected with the pressure chamber, discharge means leading from the pressure chamber, a whistle sounded from the means for supplying air to the chamber whenever the valve is open, and a whistle sounded by the escaping air when the tire is being deflated.

6. A device for inflating and deflating tires comprising a casing having a pressure chamber therein, an air line leading to the pressure chamber, a spring closed valve for controlling the communication between the pressure chamber and the air line, a diaphragm exposed to the pressure in the pressure chamber, said valve having an extension, said diaphragm having means co-operable with the extension to transmit the motion from the diaphragm to the valve, said means having passageways permitting pressure to exhaust from the chamber, said extension also constituting a valve controlling the exhaust through said passageways, a coil spring cooperable with the diaphragm for biasing the position of the same, an adjusting screw for regulating the tension of the coil spring, a gage communicating with the pressure chamber, and discharge means leading from the pressure chamber.

7. A device of the character described comprising a casing, means controlling the passage of air to effect inflation of the tire, means controlling the passage of air to effect deflation of air, an audible signal continuously sounded during the entire inflation operation, and a separate audible signal continuously sounded during the entire deflation period.

8. In a device of the character described, means for regulating the deflation of the tire, and an audible signal automatically sounded by the escaping air for the entire period of the deflation.

9. In a device of the character described, means for regulating the inflation of a tire, and an audible signal automatically sounded by the inflowing air during the entire period of inflation.

10. A device for inflating and deflating tires comprising a casing having a pressure chamber therein, an air line leading to the pressure chamber, a normally closed main air control for the valve for regulating the passage of air from the air line to the pressure chamber, a diaphragm exposed to the pressure in the pressure chamber and co-operable with the valve, means controlled by the diaphragm for regulating the exhaust of air from the pressure chamber and comprising a plate having a stud, said plate and stud being secured to the center of the diaphragm and having exhaust passageways, said main air control valve having an axial extension engageable with the wall of the passageway of the plate to provide a mechanical connection between the diaphragm and the main air control valve and to control the flow of air through the passageway of the plate and stud, a spring co-operable with the diaphragm for biasing the same, means for varying the tension of the spring, and a gage communicating with the pressure chamber.

11. A device for inflating and deflating tires comprising a casing having a pressure chamber therein, an air line leading to the pressure chamber, a normally closed main air control for the valve for regulating the passage of air from the air line to the pressure chamber, a diaphragm exposed to the pressure in the pressure chamber and co-operable with the valve, means controlled by the diaphragm for regulating the exhaust of air from the pressure chamber and comprising a plate having a stud, said plate and stud being secured to the center of the diaphragm and having exhaust passageways, said main air control valve having an axial extension engageable with the wall of the passageway of the plate to provide a mechanical connection between the diaphragm and the main air control valve and to control the flow of air through the passageway of the plate and stud, a spring co-operable with the diaphragm for biasing the same, means for varying the tension of the spring, a gage communicating with the pressure chamber, and means co-operable with the stud for guiding the same and for preventing back flow of the escaping air to the diaphragm.

12. A device for inflating and deflating tires comprising a casing having a pressure chamber therein, an air line leading to the pressure chamber, a normally closed main air control for the valve for regulating the passage of air from the air line to the pressure chamber, a diaphragm exposed to the pressure in the pressure chamber and co-operable with the valve, means controlled by the diaphragm for regulating the exhaust of air from the pressure chamber and comprising a plate having a stud, said plate and stud being secured to the center of the diaphragm and having exhaust passageways, said main air control valve having an axial extension engageable with the wall of the passageway of the plate to provide a mechanical connection between the diaphragm and the main air control valve and to control the flow of air through the passageway of the plate and stud, a spring co-operable with the diaphragm for biasing the same, means for varying the tension of the spring, a gate communicating with the pressure chamber, and means co-operable with the stud for guiding the same and for preventing back flow of the escaping air to the diaphragm, and a whistle sounded by the air escaping from the pressure chamber through the exhaust passageways to give an audible signal during the entire period of inflation.

13. In a device of the character described, a casing, an air line leading to the casing, discharge means leading from the casing, a main air controlled valve for regulating the flow of air through the casing from the air line to the discharge means, a whistle mounted on the casing, and means for establishing communication between the air line and the whistle whenever the main control valve is open.

14. In a device of the character described, a casing, an air line leading to the casing, discharge means leading from the casing, a main air controlled valve for regulating the flow of air through the casing from the air line to the discharge means, a whistle mounted on the casing, means for establishing communication between the air line and the whistle whenever the main control valve is open, and including a spring-closed whistle valve, and means for opening the spring closed whistle valve from the main air control valve whenever and as long as the main air control valve is open.

15. In a device of the character described, a casing, an air line leading to the casing, discharge means leading from the casing, a main air controlled valve for regulating the flow of air through the casing from the air line to the discharge means, a whistle mounted on the casing, means for establishing communication between the air line and the whistle whenever the main control valve is open, and including a spring-closed whistle valve, means for opening the spring-closed whistle valve from the main air control valve whenever and as long as the main air control valve is open and including a lever having a short arm engaged with the main air control valve, and a long arm engaged with the spring closed whistle valve.

16. In a device of the character described, a casing, an air line leading to the casing, discharge means leading from the casing, a main air controlled valve for regulating the flow of air through the casing from the air line to the discharge means, a whistle mounted on the casing, means for establishing communication between the air line and the whistle whenever the main control valve is open and comprising a valve seat having passageways leading to the whistle, a whistle control valve co-operable with said valve seat, means for shifting the whistle control valve from the main air control valve, and means for adjusting the valve seat consisting of a plug having screw threaded engagement with the casing and engageable with one side of the valve seat, and an elastic abutment for the other side of the valve seat.

WILLIAM A. HARRIS.